H. G. KITTO.
TRACTOR CALK.
APPLICATION FILED NOV. 19, 1918.
1,319,590. Patented Oct. 21, 1919.
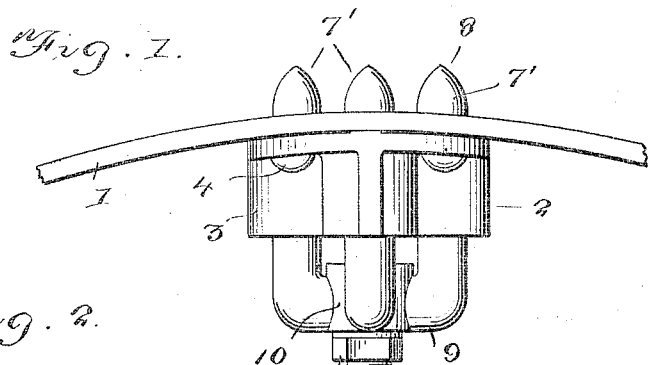
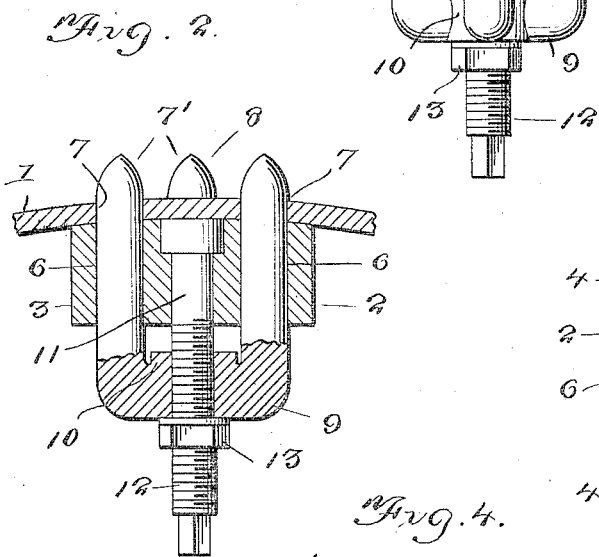
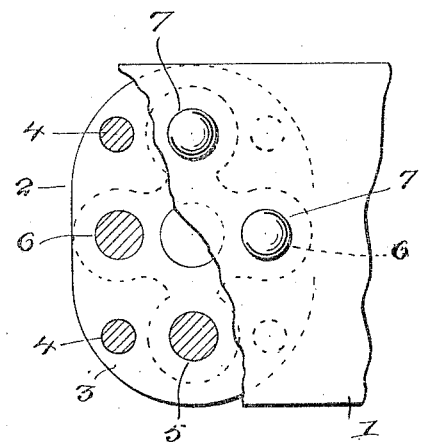
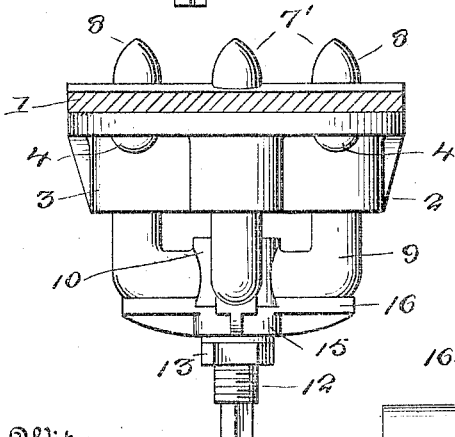
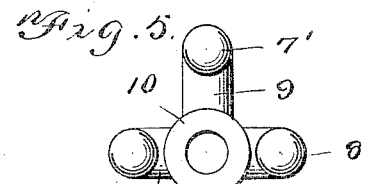
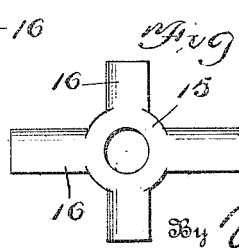
Witnesses
E. P. Ruppert
J. J. McCarthy
Inventor
H. G. Kitto
By Victor J. Evans
Attorney

UNITED STATES PATENT OFFICE.

HAROLD G. KITTO, OF DOLLAR BAY, MICHIGAN.

TRACTOR-CALK.

1,319,590.          Specification of Letters Patent.          Patented Oct. 21, 1919.

Application filed November 19, 1918. Serial No. 263,169.

*To all whom it may concern:*

Be it known that I, HAROLD G. KITTO, a citizen of the United States, residing at Dollar Bay, in the county of Houghton and State of Michigan, have invented new and useful Improvements in Tractor-Calks, of which the following is a specification.

This invention relates to certain novel and useful improvements in calks for tractor wheels and has particular application to a calk structure wherein the calk may be projected beyond the periphery of the tractor wheel to active position and retracted to inactive position whenever desired.

In carrying out the present invention it is my purpose to provide a calk structure for tractor wheels which will embrace the desired features of simplicity, efficiency and durability, which may be manufactured and marketed at small cost, which may be readily applied to any tractor wheel now in use without necessitating any material changes in the structure of such wheel, and which will embody comparatively few parts and these so arranged and correlated as to reduce the possibility of derangement to a minimum.

It is also my purpose to provide a device of the class described which will be constructed in such manner that the calks and prongs may be readily projected beyond the periphery of the tractor wheel to active position whenever desired and retracted when it is desired to render the same inactive.

With the above recited objects in view and others of a similar nature, the invention resides in the construction, combination and arrangement of parts set forth in and falling within the scope of the appended claim.

In the accompanying drawings:—

Figure 1 is a fragmentary side elevation of a tractor equipped with the calk structure constructed in accordance with the present invention.

Fig. 2 is a longitudinal sectional view through the same.

Fig. 3 is a fragmentary top plan view thereof with parts being broken away.

Fig. 4 is a view in side elevation partly in section showing a modified form of the invention.

Fig. 5 is a plan view of the prongs and the collar that connects the prongs.

Fig. 6 is a plan view of the reinforcing element used in the modified form of the invention shown in Fig. 4.

Referring now to the drawings in detail 1 designates a tractor wheel of any suitable or appropriate type, while 2 indicates my improved calk structure. In the practice of my invention I propose to employ a number of these structures upon each tractor wheel and these devices are arranged about the wheel and preferably, although not necessarily, spaced apart equal distances.

Each calk structure 2 embodies a casting 3 secured to the inner sides of the wheel felly or tire by means of rivets 4 or other suitable fastening devices. The casting 3 is formed with openings 5—5 spaced apart transversely of the wheel tire and with openings 6—6 that are spaced apart longitudinally of the wheel tire in a plane intersecting the plane in the openings 5. It is conceivable, however, that the numbers of openings 5—6 may be varied and the arrangement of such openings changed if desired. These openings aline with openings 7 respectively that are formed in the tire of the wheel.

Arranged within the openings 5—5 and 6—6 respectively are prongs 7' that have their outer ends pointed or sharpened as at 8 and their inner extremities formed integral with the arms 9 respectively that radiate from a hub or collar 10, the arms 9 being arranged at right angles to the prongs 7'. The collar 10 is threaded interiorly and alines with the openings formed in the casting 2 at the center of the latter. Swiveled within this opening is a shank or stem 11 having a threaded portion 12 that engages and coöperates with the threaded opening in the collar 10. The end of the shank or stem remote from the casting 2 is formed of angular cross section so as to accommodate a socket-wrench or other tool.

In practice, when it is desired to render the prongs 7' active so as to increase the tractive efforts of the wheel, the stem 11 is rotated so as to move the collar 10 toward the casting 2 and in this movement of the collar the prongs 7' are projected outwardly through the openings 5 and 6 and beyond the tire or rim of the tractor wheel. On the other hand, when it is desired to render the prongs inactive, the direction of rotation of the stem 11 is reversed thereby drawing the prongs 7' inwardly so as to relieve the wheel of the influence of the prongs.

I wish it to be understood that, in the practice of my invention, any number of prongs may be utilized and the relative arrangement of the prongs may also be changed.

A suitable locking means is provided to lock the stem against accidental movement relatively to the collar. In the present instance the locking means embodies a lock nut 13 mounted upon the stem and engageable with the collar 10 in order to lock the stem and collar together, after the collar has been moved to the desired position under the action of the stem.

In the modified construction shown in Figs. 4 and 6 I have provided means for reinforcing the inner ends of the prongs 7' so as to prevent mutilation of the connection between the prongs and the collar 10 in the event of excessive weight or pressure being brought to bear upon the prongs. In the present instance this reinforcing means embodies a collar 15 that is threaded or otherwise secured upon the stem 11, and ribs 16 radiating from the collar 15 and engaging the inner ends of the prongs 7' at the junction of the prongs with the collar 10.

I claim :—

As a new article of manufacture, a detachable calk for tractor wheels comprising a casting adapted to be secured to the inner periphery of the wheel, and provided with a central bore and a recess surrounding said bore, a headed bolt swiveled in said bore with the head thereof seated in said recess, the exposed portion of the bolt being threaded, a collar threaded on said bolt and a group of spurs carried by the collar and slidably arranged in alined openings in the casting and tire respectively for the purpose specified.

In testimony whereof I affix my signature.

HAROLD G. KITTO.

Copies of this patent may be obtained for five cents each, by addressing the "Commissioner of Patents, Washington, D. C."